Patented Apr. 7, 1936

2,036,494

UNITED STATES PATENT OFFICE 2,036,494

PROCESS OF PRODUCING PHOSPHATE FERTILIZER

James K. Plummer, Atlanta, Ga., assignor, by mesne assignments, to Tennessee Corporation, New York, N. Y., a corporation of New York No Drawing. Application March 26, 1930, Serial No. 439,223

5 Claims. (Cl. 71—7)

The present invention relates to the production of phosphate material containing ammonia and more particularly to a phosphate fertilizer having ammonia incorporated therein and to a process of producing the same.

Heretofore attempts have been made to provide a phosphate fertilizer which contained ammonia. One of the proposals which was suggested was the addition of ammonia usually as a pure or diluted gas or as liquid anhydrous ammonia, to a soluble phosphate-bearing material and a sulphate-bearing material under such conditions that a mixed fertilizer would be produced containing a soluble phosphate and ammonium salt. Experience has shown that the maximum amount of ammonia capable of being incorporated by the aforesaid proposal in a ton of fertilizer carrying 12% $P_2O_5$ was 34 pounds of ammonia. Attempts to produce fertilizers with a higher ammonia content showed that there was a reversion of a portion of the phosphate to insoluble forms.

Another attempt to provide a phosphate fertilizer containing ammonia was a proposal to mix aqua ammonia in a desired ratio with about 60° Bé. sulphuric acid just at or prior to the time when the acid reached the mixing pan where it was mixed with ground phosphate rock. When this process was attempted to be carried into practice it was found to develop troubles, such as spattering and sputtering which caused loss of material, inconvenience of handling and annoyance to the operator.

It is an object of the present invention to overcome the disadvantages of prior processes noted hereinabove and to provide a satisfactory ammoniated phosphate fertilizer and a practical process of producing it.

Another object is to control the temperature of the reacting materials so that they will be contacted with each other under optimum conditions of heat.

A further abject is to provide an ammoniated phosphate fertilizer which can be produced in a good mechanical condition and which will be free from stickiness due to free phosphoric acid.

A still further object of the invention is to provide a process of producing an ammoniated phosphate fertilizer in which any desirable amount of ammonia can be incorporated in the fertilizer.

Other objects and advantages of the invention will become clear from the following illustrative example.

In carrying my invention into practice, I take sulphuric acid and mix the same with a mixture of water and ammonia usually in the form of aqua ammonia. The strength of the aqua ammonia is such that the resultant mixture will have an acidity corresponding to the desired acidity required for the acidulation of the phosphate rock or other phosphate-bearing material. The aqua ammonia is preferably of such strength that it will dilute the sulphuric acid of about 60 to 66° Baumé to an acid equivalent of about 50° to about 55° Baumé. When the aforesaid resultant mixture is tested with a hydrometer due consideration must be given to the fact that ammonium sulphate is present. This means that the resultant mixture having the proper acidity specified hereinabove will show a density depending on the amount of ammonia used and its acidity can best be measured by titration. It will run 60 to 70% $H_2SO_4$. The temperature of the mixture will be somewhere in the region of that of boiling water.

Before the mixture is used, I have found that it is highly advantageous and essential to cool the same to a substantial extent. In practice I have found that satisfactory results can be obtained by cooling the mixture to approximately 100° to 115° Fahrenheit. At this temperature I use the mixture containing diluted sulphuric acid and ammonium sulphate for reaction with phosphate rock ground so that 90% passes an 80 mesh screen. The reaction between the aforesaid mixture and the ground phosphate rock can be carried out in any suitable apparatus but I prefer to conduct the reaction in the mixing pan commonly used for making phosphate fertilizer.

In cooling the mixture containing sulphuric acid, ammonia sulphate or water, any appropriate apparatus can be used. For instance, the hot mixture can be held in a tank which can be cooled by cooling coils mounted therein. By permitting cool water to flow through the cooling coils the temperature of the mixture can be reduced to any desired degree.

In the event that the tank method of cooling is not appropriate or available then the mixture can be cooled by passing the heated mixture down through a cooling tower while a stream of air is being passed upwardly to cool the mixture. Similarly, the hot mixture can be cooled by placing it in a vessel under vacuum and removing some of the water by evaporation. The evaporation of the water, as it is well known, will cause cooling of the body of liquid contained in the vessel.

When the cooled mixture containing diluted sulphuric acid and ammonium sulphate is used as set forth hereinabove no spattering or sputtering occurs and a phosphate fertilizer containing ammonium is produced.

The ammoniated phosphate fertilizer produced as described hereinabove is preferably treated with further amounts of ammonia in the form of aqua or gaseous ammonia. The amount of ammonia added can be varied depending upon the percentage desired in the final phosphate fertilizer. In practice, I prefer to add 120 lbs. of aqua ammonia having a strength of about 30% to every ton of ammoniated phosphate fertilizer. The ammonia thus added can vary in amount from say, 5 lbs. to about 35 lbs. per ton of fertilizer. By the use of this treatment I am enabled to increase the amount of ammonia in the fertilizer and, at the same time, free the fertilizer from stickiness and to improve its mechanical condition. If this treatment is omitted the ammoniated fertilizer has a tendency to be sticky and not to be in good mechanical condition. In cases where mechanical condition and stickiness are not controlling factors this last treatment can be omitted, but in commercial practice, however, it is desirable and in some cases essential to have the fertilizer free from stickiness and in good mechanical condition and consequently I prefer to utilize the second treatment. Furthermore, the amount of ammonia or the nitrogen content contained in the fertilizer can be varied as desired by proper selection of strength of aqua ammonia and the selection of the proper concentration of sulphuric acid.

Although I have described one specific method of carrying my invention into practice it will be observed that any modified method or appropriate method can be used to carry out my method and that the description of a particular way of carrying my method into practice is not to be taken as a limitation of the invention.

My improved phosphate fertilizer produced in accordance with my method outlined hereinbefore may contain 12% of soluble $P_2O_5$ and more than 40 lbs. of ammonia per ton of fertilizer. The percentage of $P_2O_5$ may vary from 2% to 16% and the ammonia can vary from 2% to 8% in my finished fertilizer. The percentage employed in any given case will depend upon the requirements of the market.

While I have described a specific example of my improved fertilizer and process merely by way of illustration, it is to be understood that I am not to be confined to the exact steps nor the specific materials given as they are to be regarded only as illustrative and typical. Various modifications may be made without departing from the spirit of my invention as defined in the appended claims.

I claim:

1. A process for the production of a phosphate fertilizer containing nitrogen which comprises treating phosphate rock with sulfuric acid of over 54° Bé. acid strength containing ammonium sulfate in solution.

2. A process for the production of a phosphate fertilizer containing nitrogen which comprises treating phosphate rock with sulfuric acid of over 54° Bé. acid strength containing ammonium sulfate in solution and treating the resulting product with ammonia.

3. A process for the production of a phosphate fertilizer containing nitrogen which comprises treating phosphate rock with sulfuric acid of about 55° Bé. strength containing ammonium sulfate in solution.

4. A process for the production of a phosphate fertilizer containing nitrogen which comprises treating phosphate rock with sulfuric acid of about 55° Bé. strength containing ammonium sulfate in solution and treating the resulting product with ammonia.

5. The process of producing a phosphate fertilizer containing nitrogen which comprises partially neutralizing sulfuric acid with ammonia to produce an ammonium sulfate-sulfuric acid solution in which the ratio of free acid to water corresponds to an acid concentration of about at least 54° Bé., reacting said solution with phosphate rock, and treating the resultant product with ammonia.

JAMES K. PLUMMER.